(12) United States Patent
Clark

(10) Patent No.: US 8,063,531 B2
(45) Date of Patent: Nov. 22, 2011

(54) PERMANENT MAGNET ARRANGEMENT FOR AN ELECTRICAL MACHINE

(75) Inventor: Paul Eaton Clark, Warwickshire (GB)

(73) Assignee: Converteam Technology Ltd., Warwickshire (GB)

( * ) Notice: Subject to any disclaimer, the term of this patent is extended or adjusted under 35 U.S.C. 154(b) by 81 days.

(21) Appl. No.: 12/685,072

(22) Filed: Jan. 11, 2010

(65) Prior Publication Data

US 2011/0169595 A1     Jul. 14, 2011

(51) Int. Cl.
    *H02K 21/12*      (2006.01)
(52) U.S. Cl. .............. 310/156.28; 310/156.08
(58) Field of Classification Search ............ 310/156.08, 310/156.12, 156.13, 156.18, 156.21, 156.31, 310/156.33, 261.1, 156.28
    See application file for complete search history.

(56) References Cited

U.S. PATENT DOCUMENTS

| | | | |
|---|---|---|---|
| 4,724,348 A | 2/1988 | Stokes | |
| 4,792,712 A | 12/1988 | Stokes | |
| 5,691,589 A | 11/1997 | Keim et al. | |
| 5,952,755 A * | 9/1999 | Lubas | 310/156.19 |
| 6,452,301 B1 * | 9/2002 | Van Dine et al. | 310/156.12 |
| 7,768,169 B2 * | 8/2010 | Clark | 310/156.31 |
| 7,836,575 B2 * | 11/2010 | Groendahl et al. | 29/596 |

FOREIGN PATENT DOCUMENTS

| | | |
|---|---|---|
| CH | 295518 | 12/1953 |
| DE | 100 57 838 A1 | 5/2002 |
| EP | 1990811 A1 | 11/2008 |
| GB | 2438443 A | 11/2007 |
| JP | 52-53204 | 4/1977 |
| WO | 2008/046780 A2 | 4/2008 |
| WO | 2009068736 A1 | 6/2009 |

\* cited by examiner

*Primary Examiner* — Nguyen N Hanh
(74) *Attorney, Agent, or Firm* — Eckert Seamans Cherin & Mellott, LLC; David C. Jenkins, Esquire; David V. Radack, Esquire

(57) ABSTRACT

A permanent magnet arrangement for an electrical machine comprises a support structure for carrying magnetic flux and a pole assembly fixed to the support structure. The pole assembly comprises a magnet pole comprising at least one piece of permanent magnet material, and a magnet carrier on which the magnet pole is mounted and which provides a magnetic flux path between the magnet pole and the support structure. The permanent magnet arrangement further comprises a sleeve containing the magnet pole and at least part of the magnet carrier. The magnet carrier is secured to the support structure to fix the pole assembly to the support structure and the sleeve is clamped to the support structure by the magnet carrier. A method for assembling the permanent magnet arrangement is also described.

16 Claims, 2 Drawing Sheets

PERMANENT MAGNET ARRANGEMENT FOR AN ELECTRICAL MACHINE

FIELD OF THE INVENTION

The present invention relates generally to a permanent magnet arrangement for an electrical machine. Embodiments of the present invention are concerned in particular with a permanent magnet arrangement in which one or more pole assemblies are releasably fixed to a support structure such as a rotor. The present invention also relates to a method for assembling a permanent magnet arrangement for an electrical machine.

BACKGROUND OF THE INVENTION

The use of high-energy-product permanent magnets (also known as rare earth magnets) in electrical machines is becoming more prevalent, especially in large-diameter low-speed permanent magnet motors and generators. Due to the high magnetic forces that are produced by these magnets and the highly brittle nature of the magnetic material and its susceptibility to corrosion if not suitably protected, their installation to form permanent magnet arrangements presents some difficulties.

A number of arrangements have been proposed which facilitate the installation of permanent magnets, and especially high-energy-product permanent magnets, into electrical machines and which at the same time provide protection for the brittle and corrodible permanent magnet material. GB 2438443, WO 2008/046780 and EP 1990811 all propose arrangements in which one or more permanent magnets are mounted on a magnet carrier. A cap or cover is fixed to the magnet carrier by mechanical fixings, welding or by other suitable means. The magnet carrier, with its permanent magnets and integral cap or cover, is finally fixed to the rotor of the electrical machine to form a permanent magnet rotor arrangement.

A particular disadvantage of these arrangements is that the cap or cover must be fixed to the magnet carrier during assembly of the permanent magnet arrangement. This is an unwelcome step which increases the complexity of the assembly process. It would, therefore, be desirable to provide an improved permanent magnet arrangement for an electrical machine which provides good mechanical and environmental protection for the permanent magnets and which can be easily assembled and installed.

SUMMARY OF THE INVENTION

According to a first aspect of the present invention, there is provided a permanent magnet arrangement for an electrical machine, the permanent magnet arrangement comprising:—
 a support structure for carrying magnetic flux;
 a pole assembly fixed to the support structure, the pole assembly comprising:—
  a magnet pole comprising at least one piece of permanent magnet material; and
  a magnet carrier on which the magnet pole is mounted and which provides a magnetic flux path between the magnet pole and the support structure;
 a sleeve containing the magnet pole and at least part of the magnet carrier;
 wherein the magnet carrier is secured to the support structure to fix the pole assembly to the support structure, the sleeve being clamped to the support structure by the magnet carrier.

According to a second aspect of the present invention, there is provided a method for assembling a permanent magnet arrangement for an electrical machine, the method comprising:
 mounting a magnet pole comprising at least one piece of permanent magnet material on a magnet carrier to provide a pole assembly;
 inserting the pole assembly into a sleeve so that the sleeve contains the magnet pole and at least part of the magnet carrier;
 securing the magnet carrier to a support structure to fix the pole assembly to the support structure, the magnet carrier providing a magnetic flux path between the magnet pole and the support structure;
 wherein the sleeve is clamped to the support structure by the magnet carrier when the pole assembly is fixed to the support structure.

The permanent magnet material from which the magnet pole is formed is very brittle and prone to fracture and corrosion. This is particularly the case when the permanent magnet material is high-energy-product or rare earth magnet material. The sleeve provides both mechanical and environmental protection for the permanent magnet material and contains the permanent magnet material in the event that the material forming the magnet pole fractures or disintegrates. It also protects the permanent magnet material from external contaminants, thereby minimising the risk of corrosion.

The sleeve is not, however, fixed to the magnet carrier and this significantly simplifies the assembly of the permanent magnet arrangement by allowing straightforward insertion of one or more pole assemblies into the sleeve, without the need to secure the sleeve to the magnet carrier. The sleeve is, however, held securely in place by virtue of the fact that it is clamped against the support structure by the magnet carrier when the magnet carrier is secured to the support structure to fix the pole assembly to the support structure.

The support structure is typically a moving component of an electrical machine, and is preferably a rotor. The rotor may be a circumferentially extending rotor or may alternatively be a linear rotor (i.e. a translator). One embodiment of the invention thus provides an electrical machine including a permanent magnet arrangement as defined herein. The electrical machine may be a radial flux permanent magnet electrical machine, an axial flux permanent magnet electrical machine or a linear permanent magnet electrical machine.

When the electrical machine is a radial flux permanent magnet electrical machine, the support structure may be a cylindrical rotor. The cylindrical rotor may be located inside a fixed radially outer cylindrical stator, outside a fixed radially inner cylindrical stator or between fixed radially inner and radially outer cylindrical stators.

The sleeve may fully contain the magnet pole. This maximises the mechanical and environmental protection provided by the sleeve. For example, the permanent magnet arrangement may include closure means at the ends of the sleeve to thereby provide full encapsulation of the magnet pole. The closure means may comprise caps which are secured to the ends of the sleeve, for example by welding, brazing, bonding, clipping or using mechanical fixings. The closure means may alternatively comprise sealing material.

The magnet carrier is preferably releasably secured to the support structure to releasably fix the pole assembly to the support structure. This facilitates removal of the pole assembly from the support structure of the permanent magnet arrangement. Such removal is desirable to permit repair or replacement of the pole assembly.

The permanent magnet arrangement preferably includes a mechanical fixing that cooperates with the support structure and the magnet carrier to fix the pole assembly to the support structure. The mechanical fixing may be a permanent mechanical fixing, for example a rivet. However, the mechanical fixing is preferably a releasable mechanical fixing to permit the aforesaid releasable fixing of the pole assembly to the support structure. The releasable mechanical fixing is conveniently a threaded fastener but may alternatively be a clip or other releasable fastener.

In some embodiments, the sleeve fully contains the magnet carrier and may fully encapsulate it. In other embodiments, part of the magnet carrier extends from the sleeve. In these other embodiments, the part of the magnet carrier that extends from the sleeve is typically secured to the support structure to fix the pole assembly to the support structure. A mechanical fixing may, for example, cooperate with the part of the magnet carrier that extends from the sleeve to fix the pole assembly to the support structure.

Alternatively or in addition, a mechanical fixing may extend through the sleeve to enable it to cooperate with the magnet carrier and thereby fix the pole assembly to the support structure. The sleeve may, for example, include an opening through which the mechanical fixing extends.

The magnet carrier may include an aperture with which the mechanical fixing may cooperate to secure the magnet carrier, and hence fix the pole assembly, to the support structure. The aperture in the magnet carrier may be aligned with the opening in the sleeve and with an aperture in the support structure. This alignment is necessary to properly accommodate the mechanical fixing and to ensure that the mechanical fixing can extend from the support structure, through the sleeve and into the aperture in the magnet carrier.

The magnet pole is preferably secured to a surface of the magnet carrier. The magnet pole may, for example, be bonded to the surface of the magnet carrier. The bonding may be provided by a suitable adhesive. Other bonding techniques, such as electron beam welding or fusion bonding, may be employed. A mechanical fixing could alternatively be employed to secure the magnet pole to the surface of the magnet carrier.

The sleeve may be formed from a material having a thickness of 1 mm or less. The permanent magnet arrangement can thus be used in electrical machines in which there is a small air gap between the support structure, typically a rotor, and the adjacent stator.

The permanent magnet arrangement may include filler material inside the sleeve. The filler material fills any voids that may be present between the pole assembly and the sleeve and may provide the magnet pole with enhanced mechanical and environmental protection, in addition to the primary protection that is provided by the sleeve. The filler material is preferably a non-hardening elastomer. The filler material may be a non-metallic filler material such as epoxy resin, polymers such as polyurethane and polyesters, and vacuum impregnated fibres or felt.

The sleeve is preferably formed entirely from non-magnetic material, such as non-magnetic stainless steel, aluminum, copper or titanium. The sleeve may, however, be formed entirely from magnetic material or both magnetic and non-magnetic material. The magnet carrier is preferably formed from magnetic material.

The sleeve may be made of an electrically insulating material, such as glass-reinforced epoxy resin. The sleeve may alternatively be made of an electrically conductive material, such as stainless steel, aluminum, copper or titanium.

In typical embodiments, the permanent magnet arrangement comprises a plurality of the aforesaid pole assemblies, each fixed to the support structure, and a plurality of sleeves each containing the magnet pole and at least part of the magnet carrier of a respective pole assembly. When the sleeves of the pole assemblies are made of an electrically conductive material, they may be connected together at their ends to form a damper cage. This may assist with the control of the electrical stability of an electrical machine in which the permanent magnet arrangement is installed.

The sleeve preferably includes at least one open end to permit insertion of the pole assembly into the sleeve and the assembly method may thus include closing the or each open end of the sleeve so that the sleeve fully encapsulates the magnet pole, and possibly also the magnet carrier.

Part of the magnet carrier may extend from the sleeve following insertion of the pole assembly into the sleeve. This may be the case even when one or both open ends of the sleeve have been closed as aforesaid so that the sleeve fully encapsulates the magnet pole. In this case, the assembly method typically includes securing the part of the magnet carrier that extends from the sleeve to the support structure to fix the pole assembly to the support structure.

The assembly method may include securing the magnet carrier to the support structure using a mechanical fixing. The assembly method may include passing the mechanical fixing through an opening in the sleeve to enable the mechanical fixing to cooperate with the magnet carrier and thereby fix the pole assembly to the support structure.

The assembly method may include introducing the aforesaid filler material into the sleeve after inserting the pole assembly into the sleeve, typically before securing the magnet carrier to the support structure to fix the pole assembly to the support structure.

DETAILED DESCRIPTION OF EMBODIMENTS OF THE INVENTION

Embodiments of the present invention will now be described by way of example only and with reference to the accompanying drawings.

Figure 1:
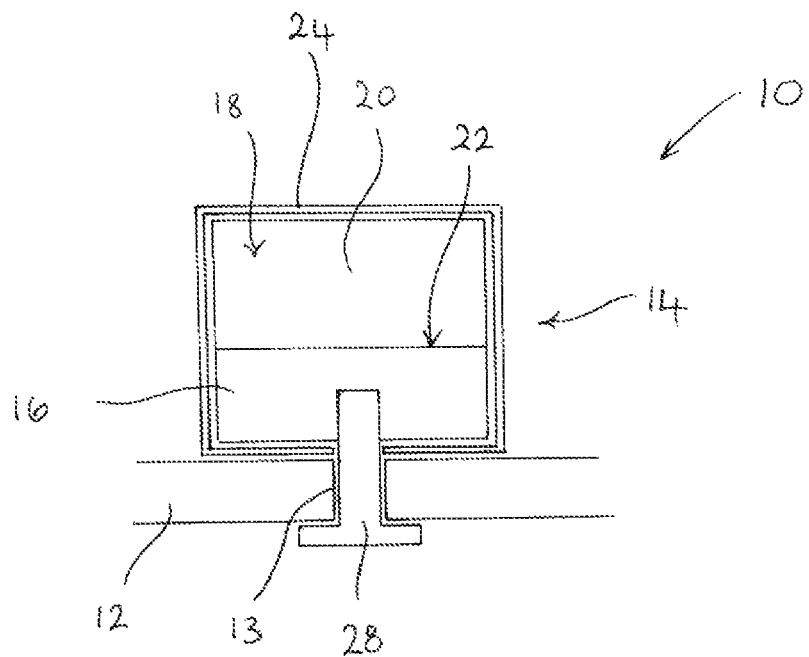
FIG. 1 is a diagrammatic cross-sectional view from one end of a first embodiment of a permanent magnet arrangement according to the invention.
Figure 2:
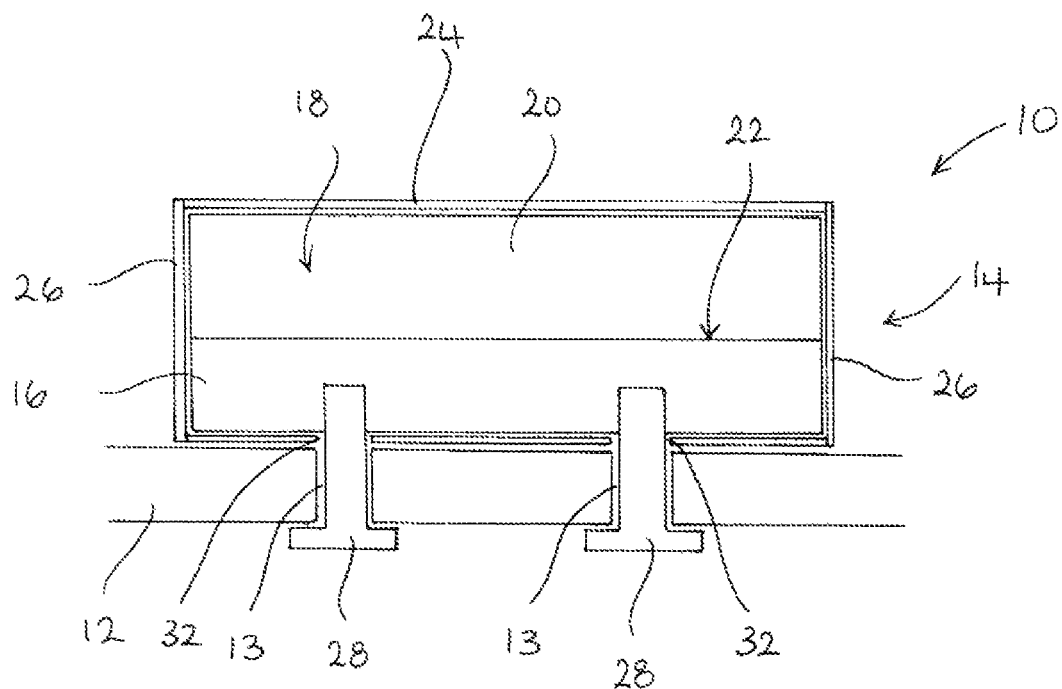
FIG. 2 is a diagrammatic cross-sectional view from one side of the first embodiment of the permanent magnet arrangement illustrated in FIG. 1.

Referring initially to FIGS. 1 and 2, a first embodiment of a permanent magnet arrangement 10 for an electrical machine comprises a support structure 12 including a plurality of apertures 13 and a pole assembly 14 fixed to the support structure 12. The support structure 12 is capable of carrying magnetic flux and is typically the rotor of an electrical machine. The rotor may be a cylindrical rotor of a radial flux machine, a disc rotor of an axial flux machine or a linear rotor (i.e. a translator) of a linear machine.

The pole assembly 14 comprises a generally elongate magnet carrier 16 made of magnetic material, such as steel, and a magnet pole 18 comprising one or more pieces of permanent magnet material 20. The magnet pole 18 is bonded to a surface 22 of the magnet carrier 16 but, as indicated above, the magnet pole 18 may be secured to the surface 22 of the magnet carrier 16 by any suitable means.

The permanent magnet arrangement 10 comprises a protective sleeve 24 into which the pole assembly 14 is inserted via an initially open end of the protective sleeve 24. In the embodiment of FIGS. 1 and 2, the entirety of the pole assembly, comprising both the magnet carrier 16 and magnet pole 18, is fully contained within the length of the protective sleeve 24. Closure means in the form of end caps 26 are secured to the ends of the protective sleeve 24 after insertion of the pole assembly 14. The protective sleeve 24 and the end caps 26 thus fully encapsulate both the magnet carrier 16 and the magnet pole 18.

In some circumstances, voids may be present between the pole assembly 14 and the protective sleeve 24 after the pole assembly 14 has been inserted into the protective sleeve 24. If necessary, suitable filler material (not shown) can be introduced into the protective sleeve 24 to fill those voids. If end caps 26 or other suitable closure means are used to close the ends of the protective sleeve 24, the filler is normally introduced into the protective sleeve 24 before one or both ends have been closed.

The pole assembly 14 is secured to the support structure 12 by a plurality of mechanical fixings 28. In the embodiment of FIGS. 1 and 2, each mechanical fixing 28 extends through the apertures 13 in the support structure 12 and through apertures 32 in the protective sleeve 24, and cooperates with the magnet carrier 16 to secure the magnet carrier 16, and hence the pole assembly 14, to the support structure 12. The mechanical fixings 28 are typically releasable mechanical fixings to enable the magnet carrier 16, and hence the pole assembly 14, to be releasably fixed to the support structure 12. However, permanent mechanical fixings may be used.

When the magnet carrier 16, and hence the pole assembly 14, is secured to the support structure 12, part of the protective sleeve 24 is clamped against the support structure 12 by the magnet carrier 16. The protective sleeve 24 is securely retained in the desired position around the pole assembly 14 by virtue of this clamping action. As discussed above, the need to fix the protective sleeve 24 to the magnet carrier 16, or indeed to the support structure 12, is thus completely eliminated.

In typical permanent magnet arrangements, a plurality of pole assemblies 14, each comprising a magnet carrier 16 and a magnet pole 18, and associated protective sleeves 24 containing the pole assemblies 14 are fixed adjacent to each other on the support structure 12 by securing the magnet carrier 16 of each pole assembly 14 to the support structure 12.

Figure 3:
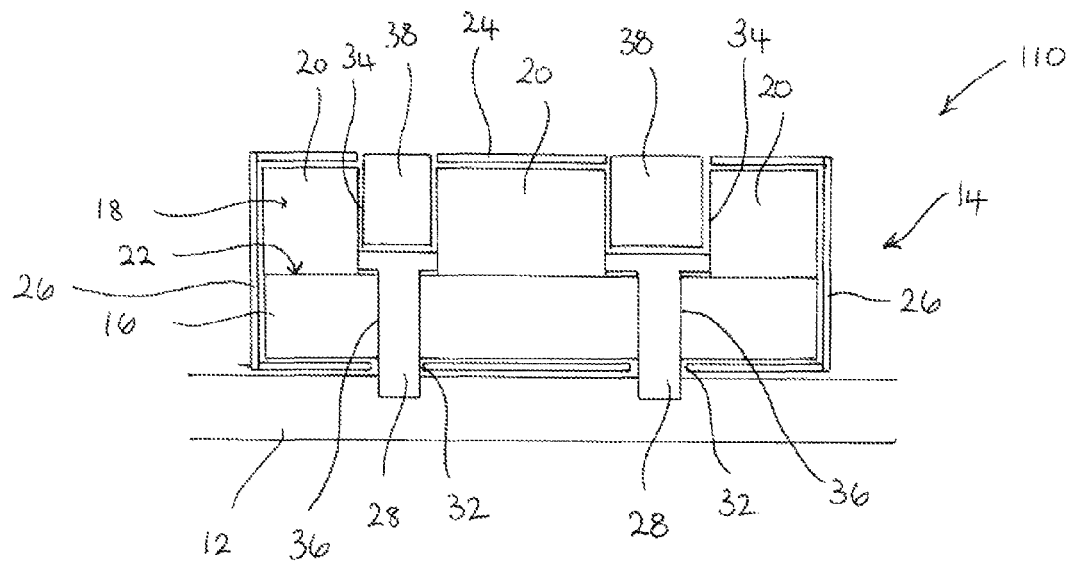
FIG. 3 is a diagrammatic cross-sectional view from one side of a second embodiment of a permanent magnet arrangement according to the invention.

FIG. 3 illustrates a second embodiment of a permanent magnet arrangement 110 which is similar to the permanent magnet arrangement illustrated in FIGS. 1 and 2 and in which corresponding features are designated using corresponding reference numerals.

In the permanent magnet arrangement 110, the pole assembly 14 comprises a plurality of pieces of permanent magnet material 20 secured to the surface 22 of the magnet carrier 16. The individual pieces of permanent magnet material 20 are spaced apart to define openings 34 for receiving the mechanical fixings 28. The mechanical fixings 28 extend though apertures 36, 32 in both the magnet carrier 16 and the protective sleeve 24 to enable the mechanical fixings 28 to engage the support structure 12. The mechanical fixings 28 thus cooperate with both the magnet carrier 16 and the support structure 12 so that they fix the magnet carrier 16, and hence the pole assembly 14, to the support structure 12. The protective sleeve 24 is again clamped to the support structure 12 by the magnet carrier 16 to secure it firmly in position.

In order to ensure that the protective sleeve 24 adequately protects the pieces of permanent magnet material 20 forming the magnet pole 18, a plug 38 or similar sealing means may be provided in each opening 34. The plug 38 or similar sealing means might be removable, and this would certainly be the case when releasable mechanical fixings 28 are used to releasably secure the magnet carrier 16, and hence the pole assembly 14, to the support structure 12.

In a modification to this second embodiment, the magnet pole 18 could comprise a single piece of permanent magnet material 20 and openings 34 could be provided through the permanent magnet material 20, for example by drilling.

Figure 4:
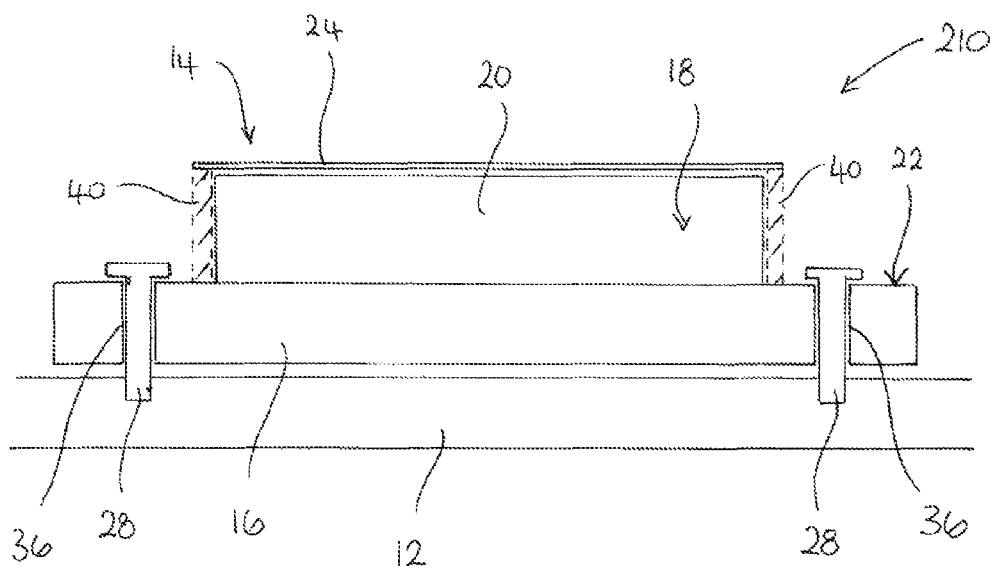
FIG. 4 is a diagrammatic cross-sectional view from one side of a third embodiment of a permanent magnet arrangement according to the invention.

FIG. 4 illustrates a third embodiment of a permanent magnet arrangement 210 which is generally similar to the permanent magnet arrangement illustrated in FIGS. 1 and 2 and in which corresponding features are designated using corresponding reference numerals.

In the permanent magnet arrangement 210, the magnet pole 18 is fully contained within the protective sleeve 24 to provide it with the necessary mechanical and environmental protection. However, the ends of the magnet carrier 16 extend from the ends of the protective sleeve 24 and are, thus, exposed. It is those exposed ends of the magnet carrier 16 that are secured to the support structure 12 by the mechanical fixings 28.

In this particular embodiment, the use of end caps 26 to close the ends of the protective sleeve 24 may be inappropriate. Closure means in the form of sealant material 40 may instead be used to close the ends of the protective sleeve 24 to maximise the mechanical and environmental protection provided to the magnet pole 18.

Although embodiments of the invention have been described in the preceding paragraphs, it should be understood that various modifications may be made to those embodiments without departing from the scope of the present invention, as claimed.

What is claimed is:

1. A permanent magnet arrangement for an electrical machine, the permanent magnet arrangement comprising:—
   a support structure for carrying magnetic flux;
   a pole assembly fixed to the support structure, the pole assembly comprising:—
      a magnet pole comprising at least one piece of permanent magnet material; and
      a magnet carrier on which the magnet pole is mounted and which provides a magnetic flux path between the magnet pole and the support structure;
   a sleeve containing the magnet pole and at least part of the magnet carrier;
   wherein the magnet carrier is secured to the support structure to fix the pole assembly to the support structure, the sleeve being clamped to the support structure by the magnet carrier.

2. A permanent magnet arrangement according to claim 1, wherein the sleeve fully contains the magnet pole.

3. A permanent magnet arrangement according to claim 1, wherein the sleeve fully contains the magnet carrier.

4. A permanent magnet arrangement according to claim 1, wherein part of the magnet carrier extends from the sleeve.

5. A permanent magnet arrangement according to claim 4, wherein the part of the magnet carrier that extends from the sleeve is secured to the support structure to fix the pole assembly to the support structure.

6. A permanent magnet arrangement according to claim 1, wherein the permanent magnet arrangement includes a mechanical fixing that cooperates with the support structure and the magnet carrier to fix the pole assembly to the support structure.

7. A permanent magnet arrangement according to claim 6, wherein the mechanical fixing cooperates with a part of the magnet carrier that extends from the sleeve to fix the pole assembly to the support structure.

8. A permanent magnet arrangement according to claim 6, wherein the mechanical fixing extends through the sleeve to enable it to cooperate with the magnet carrier and thereby fix the pole assembly to the support structure.

9. A permanent magnet arrangement according to claim 1, wherein the magnet carrier is releasably secured to the support structure to releasably fix the pole assembly to the support structure.

10. A permanent magnet arrangement according to claim 1, further including closure means for closing the ends of the sleeve.

11. A method for assembling a permanent magnet arrangement for an electrical machine, the method comprising:
   mounting a magnet pole comprising at least one piece of permanent magnet material on a magnet carrier to provide a pole assembly;
   inserting the pole assembly into a sleeve so that the sleeve contains the magnet pole and at least part of the magnet carrier;
   securing the magnet carrier to a support structure to fix the pole assembly to the support structure, the magnet carrier providing a magnetic flux path between the magnet pole and the support structure;
   wherein the sleeve is clamped to the support structure by the magnet carrier when the pole assembly is fixed to the support structure.

12. A method according to claim 11, wherein the sleeve includes at least one open end to permit insertion of the pole assembly into the sleeve and the method includes closing the or each open end of the sleeve so that the sleeve fully encapsulates the magnet pole.

13. A method according to claim 11, wherein part of the magnet carrier extends from the sleeve following insertion of the pole assembly into the sleeve and the method includes securing the part of the magnet carrier that extends from the sleeve to the support structure to fix the pole assembly to the support structure.

14. A method according to claim 11, wherein the method includes securing the magnet carrier to the support structure using a mechanical fixing.

15. A method according to claim 14, wherein the method includes passing the mechanical fixing through an opening in the sleeve to enable the mechanical fixing to cooperate with the magnet carrier and thereby fix the pole assembly to the support structure.

16. A method according to claim 11, wherein the method includes introducing a filler material into the sleeve after inserting the pole assembly into the sleeve.

* * * * *